United States Patent
Hsueh

(10) Patent No.: US 8,435,609 B2
(45) Date of Patent: May 7, 2013

(54) LIQUID CRYSTAL ALIGNMENT AGENT, LIQUID CRYSTAL ALIGNMENT FILM FORMED THEREFROM, AND LIQUID CRYSTAL DISPLAY ELEMENT PROVIDED WITH THE LIQUID CRYSTAL ALIGNMENT FILM

(75) Inventor: Huai-Pin Hsueh, Taichung (CN)

(73) Assignee: Chi Mei Corporation, Tainan (TW)

( * ) Notice: Subject to any disclaimer, the term of this patent is extended or adjusted under 35 U.S.C. 154(b) by 246 days.

(21) Appl. No.: 12/923,184

(22) Filed: Sep. 8, 2010

(65) Prior Publication Data

US 2011/0082237 A1    Apr. 7, 2011

(30) Foreign Application Priority Data

Oct. 2, 2009 (TW) ............................... 98133633 A

(51) Int. Cl.
*C08L 63/00* (2006.01)
*C09K 19/38* (2006.01)
*G02F 1/1337* (2006.01)

(52) U.S. Cl.
USPC ........... 428/1.26; 349/123; 349/127; 525/423

(58) Field of Classification Search .................. None
See application file for complete search history.

(56) References Cited

U.S. PATENT DOCUMENTS 7,211,303 B2 * 5/2007 Momoi .......................... 428/1.1

FOREIGN PATENT DOCUMENTS

| CN | 1637526 A | 7/2005 |
| CN | 1712491 A | 12/2005 |
| CN | 1718674 A | 1/2006 |
| CN | 101470302 A | 7/2009 |
| JP | 1995-234410 | 9/1995 |
| JP | 2008-40473 | 2/2008 |
| JP | 2008-40473 A * | 2/2008 |

OTHER PUBLICATIONS

Derwent accession No. 2008-D91507 for Japanese Patent No. 2008-40473 A, Kondo et al., Feb. 21, 2008, three pages.*
Derwent accession No. 2009-L40213 for Chinese Patent No. 101470302 A, Hisada et al., uly 1, 2009, three pages.*
Derwent accession No. 2005-525127 for Chinese Patent No. 1637526 A and U.S. Patent No. 7,211,303, Momoi et al., Jul. 13, 2005, three pages.*
Derwent accession No. 2006-121387 for Chinese Patent No. 1718674 A, Kimura et al., Jan. 11, 2006, two pages.*
Derwent accession No. 2006-073783 for Chinese Patent No. 1712491 A, Kesuke et al., Dec. 28, 2005, two pages.*

* cited by examiner

*Primary Examiner* — Robert Sellers

(57) ABSTRACT

The present invention provides a liquid crystal alignment agent and a liquid crystal alignment film formed therefrom, as well as a liquid crystal display element provided with the liquid crystal alignment film. More specifically, the present invention provides a liquid crystal alignment agent and liquid crystal alignment film formed therefrom, as well as a liquid crystal display element provided with the liquid crystal alignment film without image sticking problems and having superior voltage holding ratio. The liquid crystal alignment agent includes: a polymer (A) obtained from a reaction between tetracarboxylic dianhydride compound and diamine compounds, an epoxy compound (B), and an organic solvent (C). Wherein the liquid crystal alignment agent is coated on a glass substrate, and heated for 15 minutes at 220° C. to forth a hard coating film. The hard coating film is extracted for 72 hours by using acetone at 60° C. to obtain an extract, an epoxy value on the extract is designated O, and based on 100 parts by weight of the solid content of the liquid crystal alignment agent, the parts by weight of the epoxy compound (B) is designated W, the O and W conform to the following equation:

$$[O \div W \times 10^3] \leq 0.55.$$

6 Claims, No Drawings

LIQUID CRYSTAL ALIGNMENT AGENT, LIQUID CRYSTAL ALIGNMENT FILM FORMED THEREFROM, AND LIQUID CRYSTAL DISPLAY ELEMENT PROVIDED WITH THE LIQUID CRYSTAL ALIGNMENT FILM

BACKGROUND OF THE INVENTION (a) Field of the Invention

The present invention relates to a liquid crystal alignment agent and a liquid crystal alignment film formed therefore, as well as a liquid crystal display element provided with the liquid crystal alignment film; and more particularly provides a liquid crystal alignment agent and a liquid crystal alignment film formed therefore, as well as a liquid crystal display element provided with the liquid crystal alignment film without image sticking problems and having superior voltage holding ratio.

(b) Description of the Prior Art

At present, the polymers such as polyamide acid, polyimide, and the like, are used as a liquid crystal alignment agent, after coating onto a substrate having a transparent conducting film, heating and alignment process to form a liquid crystal alignment film for the liquid crystal display element. Finally, two of the substrates coated with alignment film are placed in opposite directions to form a cell gap holding a liquid crystal layer between the two substrates.

Nematic liquid crystal display elements are predominantly used in general liquid crystal display elements, and examples of types of nematic liquid crystal display elements actually used include: (1) a TN (Twisted Nematic) liquid crystal display element, comprising a liquid crystal alignment direction of one side substrate placed at a 90 degree angle to a liquid crystal alignment direction of the other side substrate; (2) a STN (Super Twisted Nematic) liquid crystal display element comprising a liquid crystal alignment direction of one side substrate placed at an angle greater than 180 degrees to a liquid crystal alignment direction of the other side substrate; (3) a TFT (Thin Film Transistor) liquid crystal display element which uses a thin film transistor.

However, the liquid crystal alignment films of the prior art have inferior rubbing resistance, which results in poor pretilt angle stability. Hence, in order to improve the resistance of alignment films; an epoxy compounds are added to the alignment agent, such as Japanese Patent Publication No. 07-234,410 which discloses using a compounds containing more than 2 epoxy function groups to serve as an additive agent to the liquid crystal alignment agent. However, such epoxy compounds in the alignment film results in an unreacted epoxy compounds after post-bake easily, causing image sticking problems.

SUMMARY OF THE INVENTION

The present invention provides a liquid crystal alignment agent and liquid crystal alignment film formed therefore, as well as a liquid crystal display element provided with a liquid crystal alignment film without image sticking problems and having superior voltage holding ratio.

The liquid crystal alignment agent of the present invention comprises: a polymer (A) obtained from a reaction between a tetracarboxylic dianhydride compound and a diamine compound, an epoxy compound (B), and an organic solvent (C). The liquid crystal alignment agent is coated onto a glass substrate, and heated for 15 minutes at 220° C. to form a hard coating film. The hard coating film is extracted for 72 hours using acetone at 60° C. to obtain an extract. An epoxy value on the extract is designated O, and based on 100 parts by weight of the solid content of the liquid crystal alignment agent, the parts by weight of the epoxy compound (B) is designated W. Accordingly, the O and W conform to the following equation:

$$[O \div W \times 10^3] \leq 0.55$$

The following provides a separate detailed description of each composition of the present invention:

In the liquid crystal alignment agent of the present invention, the polymer (A) obtained from a reaction between a tetracarboxylic dianhydride compound and diamine compound comprises a polyamic acid polymer (A-1) and/or a polyimide polymer (A-2) and/or a polyimide block copolymer (A-3); in which the polyimide block copolymer (A-3) comprises a polyamic acid block copolymer (A-3-1) and/or a polyimide block copolymer (A-3-2) and/or a polyamic acid-polyimide block copolymer (A-3-3).

Tetracarboxylic Dianhydride Compound

The tetracarboxylic dianhydride compounds used in the present invention include aliphatic tetracarboxylic dianhydride, alicyclic tetracarboxylic dianhydride and aromatic tetracarboxylic dianhydride.

Examples of the aliphatic tetracarboxylic dianhydride include ethane tetracarboxylic dianhydride, ethylene tetracarboxylic acid dianhydride. Examples of the alicyclic tetracarboxylic dianhydride include: 1,2,3,4-cyclobutane tetracarboxylic dianhydride, 1,2-dimethyl-1,2,3,4-cyclobutane tetracarboxylic dianhydride, 1,3-dimethyl-1,2,3,4-cyclobutane tetracarboxylic dianhydride, 1,3-dichloro-1,2,3,4-cyclobutane tetracarboxylic dianhydride, 1,2,3,4-tetramethyl-1,2,3,4-cyclobutane tetracarboxylic dianhydride, 1,2,3,4-cyclopentane tetracarboxylic dianhydride, 1,2,4,5-cyclohexane tetracarboxylic dianhydride, 3,3',4,4'-dicyclohexane tetracarboxylic dianhydride, cis-3,7-dibutyl cycloheptyl-1,5-diene-1,2,5,6-tetracarboxylic dianhydride, 2,3,5-tricarboxycyclopentyl acetic dianhydride, 2,3,4,5-tetrahydrofuran tetracarboxylic dianhydride, 3,4-dicarboxy-1,2,3,4-tetrahydronaphthalene-1-succinic acid dianhydride, 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-methyl-5-(tetrahydro-2,5-dioxo-3-furanyl)-naphtho[1,2-c]-furan-1,3-dione, 1,3,3a,4,5,9b-hexahydro-5-ethyl-5-(tetrahydro-2,5-dioxo-3-furanyl)-naphtho[1,2-c]-furan-1,3-dione, 1,3,3a,4,5,9b-hexahydro-7-methyl-5-(tetrahydro-2,5-dioxo-3-furanyl)-naphtho[1,2-c]-furan-1,3-dione, 1,3,3a,4,5,9b-hexahydro-7-ethyl-5-(tetrahydro-2,5-dioxo-3-furanyl)-naphtho[1,2-c]-furan-1,3-dione, 1,3,3a,4,5,9b-hexahydro-8-methyl-5-(tetrahydro-2,5-dioxo-3-furanyl)-naphtho[1,2-c]-furan-1,3-dione, 1,3,3a,4,5,9b-hexahydro-8-ethyl-5-(tetrahydro-2,5-dioxo-3-furanyl)-naphtho[1,2-c]-furan-1,3-dione, 1,3,3a,4,5,9b-hexahydro-5,8-dimethyl-5-(tetrahydro-2,5-dioxo-3-furanyl)-naphtho[1,2-c]-furan-1,3-dione, 5-(2,5-dioxo tetrahydrofuranyl)-3-methyl-3-cyclohexene ~1,2-dicarboxyl ic dianhydride, bicyclo[2.2.2]-octa-7-ene-2,3,5,6-tetracarboxylic dianhydride and the compounds represented by the following Formulas (I-1) and (I-2):

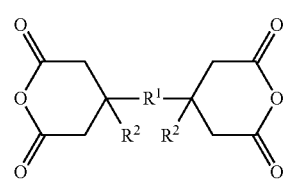

Formula (I-1)

-continued

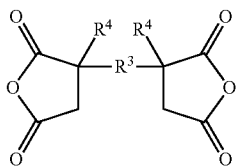

Formula (I-2)

(wherein, $R^1$ and $R^3$ are a divalent organic group having an aromatic ring, $R^2$ and $R^4$ are hydrogen atoms or alkyl group, and a plurality of existing $R^2$ and $R^4$ can be respectively identical or different.)

Examples of aromatic tetracarboxylic acid dianhydrides include pyromellitic dianhydride, 3,3',4,4'-benzophenone tetracarboxylic dianhydride, 3,3',4,4'-biphenyl sulfone tetracarboxylic dianhydride, 1,4,5,8-naphthalene tetracarboxylic dianhydride, 2,3,6,7-naphthalene tetracarboxylic dianhydride, 3,3'-4,4'-biphenylethane tetracarboxylic dianhydride, 3,3', 4,4'-dimethyl diphenyl silane tetracarboxylic dianhydride, 3,3',4,4'-tetraphenyl silane tetracarboxylic dianhydride, 1,2,3,4-furan tetracarboxylic dianhydride, 4,4'-bis(3,4-dicarboxylphenoxy) diphenyl sulfide dianhydride, 4,4'-bis(3,4-dicarboxylphenoxy) diphenyl sulfone dianhydride, 4,4'-bis (3,4-dicarboxyl phenoxy) diphenyl propane dianhydride, 3,3',4,4'-perfluoroisopropylidene diphthalic acid dianhydride, 3,3',4,4'-diphenyl tetracarboxylic dianhydride, bis(phthalic acid) phenylphosphine oxide dianhydride, p-phenylene-bis(triphenyl phthalic acid) dianhydride, m-phenylene-bis(triphenyl phthalic acid) dianhydride, bis (triphenyl phthalic acid)-4,4'-diphenyl ether dianhydride, bis (triphenyl phthalic acid)-4,4'-diphenyl methane dianhydride, ethylene glycol-bis(anhydrotrimellitate), propylene glycol-bis(anhydrotrimellitate), 1,4-butylene-glycol-bis(anhydrotrimellitate), 1,6-hexylene-bis(anhydrotrimellitate), 1,8-octadiene-bis(anhydrotrimellitate), 2,2-bis(4-oxyphenyl) propane-bis(anhydrotrimellitate), and the aromatic tetracarboxylic dianhydride compounds represented in the following Formulas (1)~(4). These compounds may be used alone or in admixture of two or more.

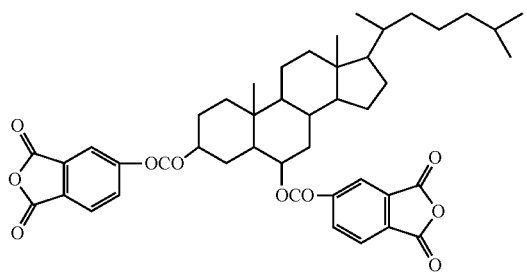

Formula (1)

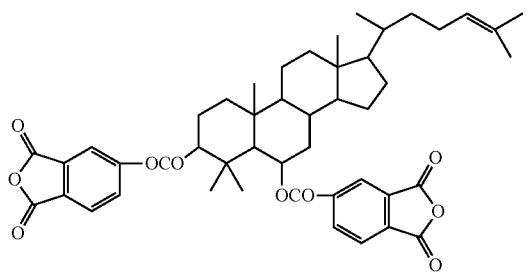

Formula (2)

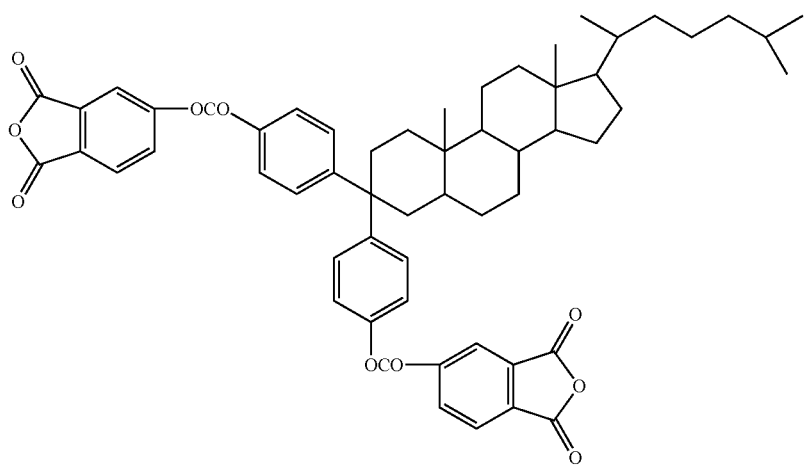

Formula (3)

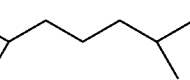

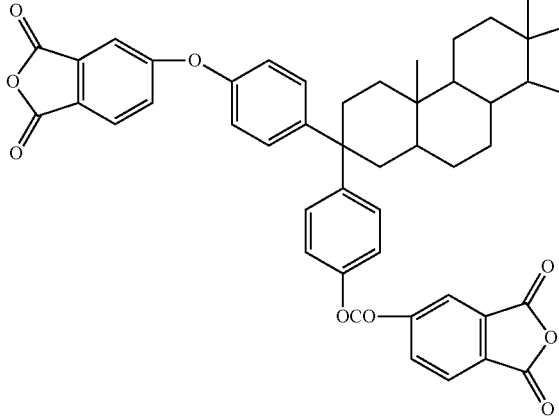

Among the aforementioned tetracarboxylic dianhydride compounds, 1,2,3,4-cyclobutane tetracarboxylic dianhydride, 1,2,3,4-cyclopentane tetracarboxylic dianhydride, 2,3,5-tricarboxylic cyclopentylacetic dianhydride, 3,4-dicarboxyl-1,2,3,4-tetrahydronaphthalene-1-succinic acid dianhydride, the compounds represented by the following Formulas (5)~(7) taken as examples from the compounds represented by the aforementioned Formula (I-1), the compounds represented by the following Formula (8) taken as an example from the compounds represented by the aforementioned Formula (I-2), pyromellitic dianhydride, 3,3',4,4'-benzophenone tetracarboxylic acid dianhydride, and 3,3',4,4'-diphenyl sulfone tetracarboxylic dianhydride are preferred.

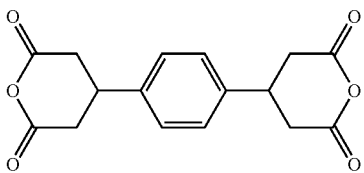

Formula (5)

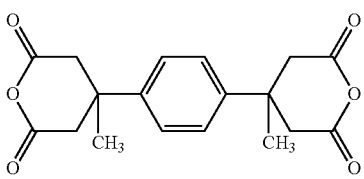

Formula (6)

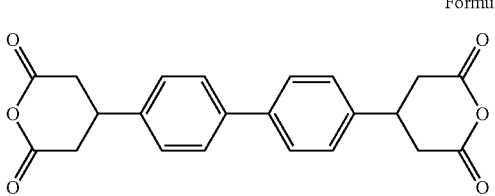

Formula (7)

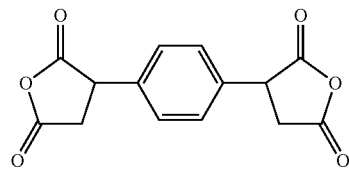

Formula (8)

Diamine Compounds

The diamine compounds used in the present invention include aliphatic or alicyclic diamine compounds, aromatic diamine compounds, or other diamine compounds.

Examples of aliphatic or alicyclic diamine compounds include: 1,3-diaminopropane, 1,4-diaminobutane, 1,5-diaminopentane, 1,6-diaminohexane, 1,7-diaminoheptane, 1,8-diaminooctane, 1,9-diaminononane, 4,4-diamino heptamethylenediamine, 1,4-diaminocyclohexane, isophoronediamine, tetrahydro-bicyclopentadiene diamine, hexahydro-4,7-methanoindanylenedimethylenediamine, tricyclic[6•2•1•0$^{2,7}$]-undecylene dimethyl diamine, 4,4'-methylene bis(cyclohexylamine).

Examples of aromatic diamine compounds include: p-phenylenediamine, m-phenylenediamine, o-phenylenediamine, 4,4'-diaminodiphenyl methane, 4,4'-diaminodiphenylethane, 4,4'-diaminodiphenyl sulfide, 4,4'-diaminodiphenyl sulfone, 3,3'-dimethyl-4,4'-diaminobiphenyl, 4,4'-diamino benzanilide, 4,4'-diaminodiphenyl ether, 1,5-diaminonaphthalene, 2,2'-dimethyl-4,4'-diaminobiphenyl, 5-amino-1-(4'-aminophenyl)-1,3,3-trimethylindane, 6-amino-1-(4'-aminophenyl)-1,3,3-trimethylindane, 3,4'-diaminodiphenyl ether, 3,3'-diaminobenzophenone, 3,4'-diaminobenzophenone, 4,4'-diaminobenzophenone, 2,2-bis[4-(4-aminophenoxy)phenyl] propane, 2,2-bis[4-(4-aminophenoxy)phenyl] hexafluoropropane, 2,2-bis(4-aminophenyl) hexafluoropropane, 2,2-bis[(4-(4-aminophenoxy)phenyl] sulfone, 1,4-bis(4-aminophenoxy)benzene, 1,3-bis(4-aminophenoxy)benzene, 1,3-bis(3-aminophenoxy)benzene, 9,9-bis(4-amino phenyl)-10-hydroanthracene, 2,7-diaminofluorene, 9,9-bis(4-aminophenyl)fluorene, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-(p-phenyleneisopropylidene)bisaniline, 4,4'-(m-phenyleneisopropylidene)bisaniline, 2,2'-bis[4-(4-amino-2-trifluoromethylphenoxy)

phenyl]hexafluoropropane 4,4'-diamino-2,2'-bis (trifluoromethane)biphenyl, 4,4'-bis[(4-amino-2-trifluoromethyl)phenoxy]octafluorobiphenyl.

Examples of other diamine compounds include: 2,3-diaminopyridine, 2,6-diaminopyridine, 3,4-diaminopyridine, 2,4-diaminopyrimidine, 5,6-diamino-2,3-dicyanopyrazine, 5,6-diamino-2,4-dihydroxypyrimidine, 2,4-diamino-6-dimethyl amino-1,3,5-triazine, 1,4-bis(3-amino propyl)piperazine, 2,4-diamino-6-isopropoxy-1,3,5-triazine, 2,4-diamino-6-methoxy-1,3,5-triazine, 2,4-diamino-6-phenyl-1,3,5-triazine, 2,4-diamino-6-methyl-s-triazine, 2,4-diamino-1,3,5-triazine, 4,6-diamino-2-vinyl-s-triazine, 2,4-diamino-5-phenylthiazole, 2,6-diaminopurin, 5,6-diamino-1,3-dimethyluracil, 3,5-diamino-1,2,4-triazole, 6,9-diamino-2-ethyoxyl acridine lactate, 3,8-diamino-6-phenylethidium, 1,4-diaminopiperazine, 3,6-diaminopyridine, bis(4-aminophenyl)phenyl amine, and the compounds represented by the following Formulas (II-1) and (II-2), namely diamines having two primary amino groups and a nitrogen atom other than the primary amino group in the molecule are included.

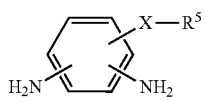

Formula (II-1)

(wherein, $R^5$ is a monovalent organic group having a ring structure containing a nitrogen atom selected from the group consisting of pyridine, pyrimidine, triazine, piperidine and piperazine; and X is a divalent organic group.)

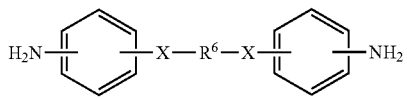

Formula (II-2)

(wherein, $R^6$ is a divalent organic group having a ring structure containing a nitrogen atom selected from the group consisting of pyridine, pyrimidine, triazine, piperidine and piperazine; and X is a divalent organic group with the proviso that a plurality of X's may be the same or different.)

As well as the compounds represented by the following Formulas (II-3)~(II-5):

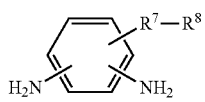

Formula (II-3)

(wherein, $R^7$ is a divalent organic group selected from the group consisting of —O—, —COO—, —COO—, —NHCO—, —CONH— and —CO—; $R^8$ is a monovalent organic group having a group selected from the group consisting of a steroid skeleton, a trifluoromethyl group, a fluoro group or an alkyl group having 6 to 30 carbon atoms.)

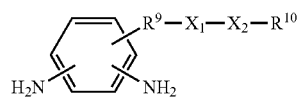

Formula (II-4)

(wherein, $R^9$ is a divalent organic group selected from the group consisting of —O—, —COO—, —COO—, —NHCO—, —CONH— and —CO—; $X^1$ and $X^2$ are having the structure selected from alicyclic, aromatic and heterocyclic ring skeleton; $R^{10}$ is a monovalent organic group selected from the group consisting of an alkyl group having 3 to 18 carbon atoms, an alkoxy group having 3 to 18 carbon atoms, a fluoroalkyl group having 1 to 5 carbon atoms, a fluoroalkoxy group having 1 to 5 carbon atoms, a cyano group and halogen atoms.)

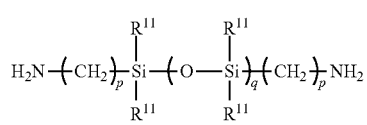

Formula (II-5)

(wherein, $R^{11}$ is a hydrocarbon group having 1 to 12 carbon atoms, with the proviso that a plurality of $R^{11}$'s may be the same or different; p is an integer from 1 to 3, q is an integer from 1 to 20.)

And the compounds represented by the following Formulas (9)~(13), and these diamine compounds may be used alone or in admixture of two or more.

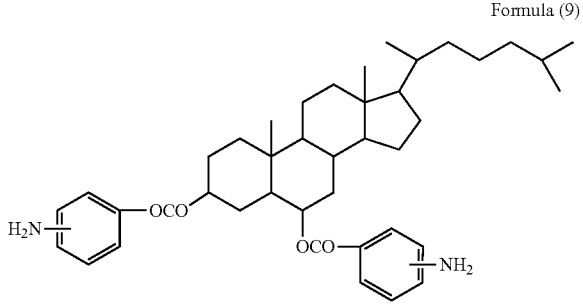

Formula (9)

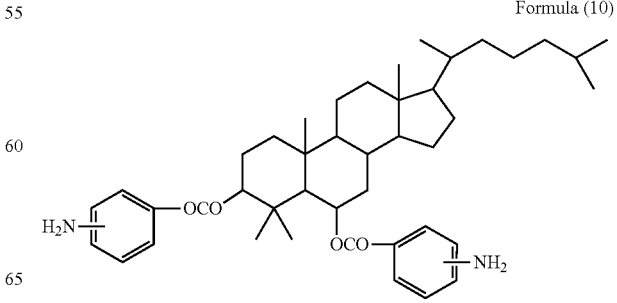

Formula (10)

-continued

Formula (11)

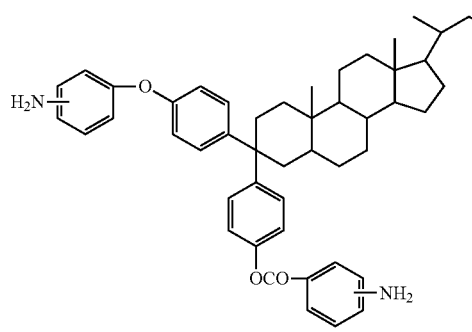

Formula (12)

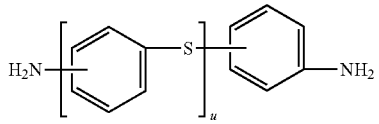

Formula (13)

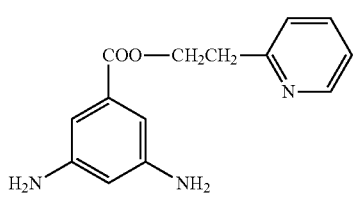

(wherein, t is an integer from 2 to 12, u is an integer from 1 to 5.)

Among the aforementioned diamine compounds, p-phenylenediamine, 4,4'-diaminodiphenyl methane, 4,4'-diaminodiphenyl sulfide, 1,5-diaminonaphthalene, 2,7-diaminofluorene, 4,4'-diaminodiphenyl ether, 2,2-bis[4-(4-aminophenoxy)phenyl]propane, 9,9-bis(4-aminophenyl) fluorene, 2,2-bis[4-(4-aminophenoxy)phenyl] hexafluoropropene, 2,2-bis(4-aminophenyl) hexafluoropropene, 4,4'-(p-phenyleneisopropylidene) bisaniline, 4,4'-(m-extended phenyl isopropylidene) bisaniline, 1,4-diaminocyclohexane, 4,4'-methylene bis (cyclohexylamine), 1,4-bis(4-aminophenoxy)benzene, 4,4'-bis(4-aminophenoxy)biphenyl, 2,6-diaminopyridine, 3,4-diaminopyridine, 2,4-diaminopyrimidine, 3,6-diaminoacridine, the compounds represented by the aforementioned Formulas (9)~(13), the compound represented by the Formula (14) below taken as an example from the compounds represented by the aforementioned Formula (II-1), the compound represented by the Formula (15) below taken as an example from the compounds represented by the aforementioned Formula (II-2), the compounds represented by the Formulas (16)~(24) below taken as examples from the compounds represented by the aforementioned Formula (II-3), the compounds depicted by the Formulas (25)~(27) below taken as examples from the compounds represented by the aforementioned Formula (II-4), and liquid crystalline diamine compounds represented by the Formulas (28)~(39) are preferred.

Formula (14)

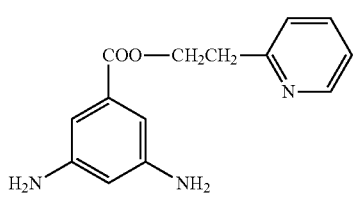

Formula (15)

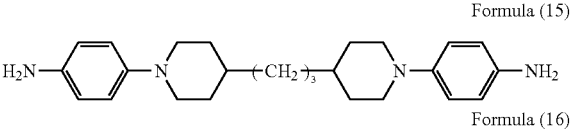

Formula (16)

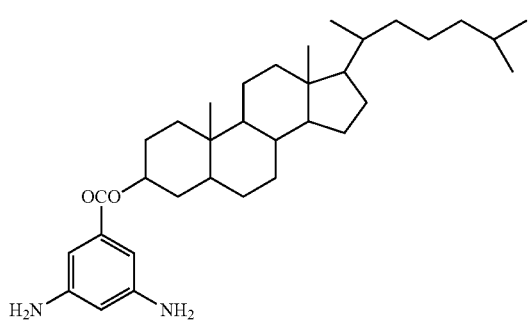

Formula (17)

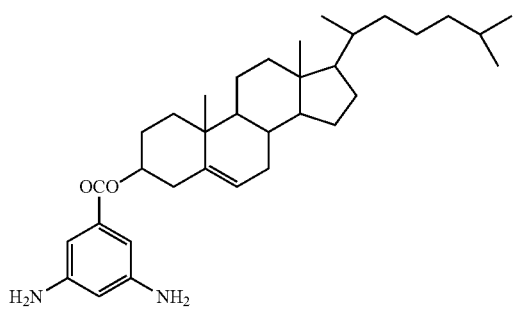

Formula (18)

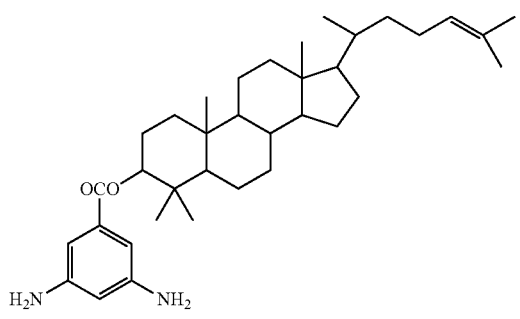

Formula (19)

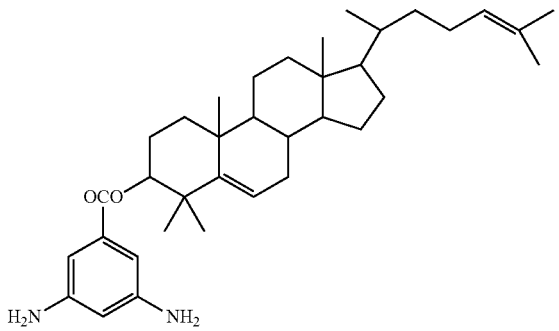

Formula (20)

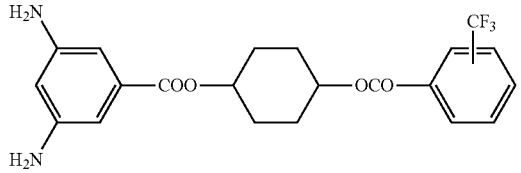

Formula (21)
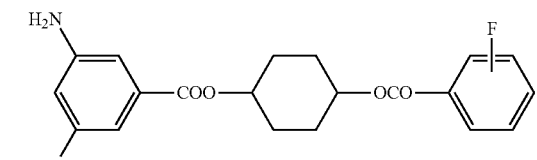
Formula (22)
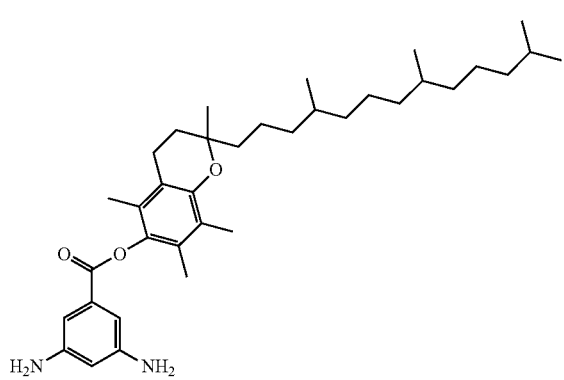
Formula (23)
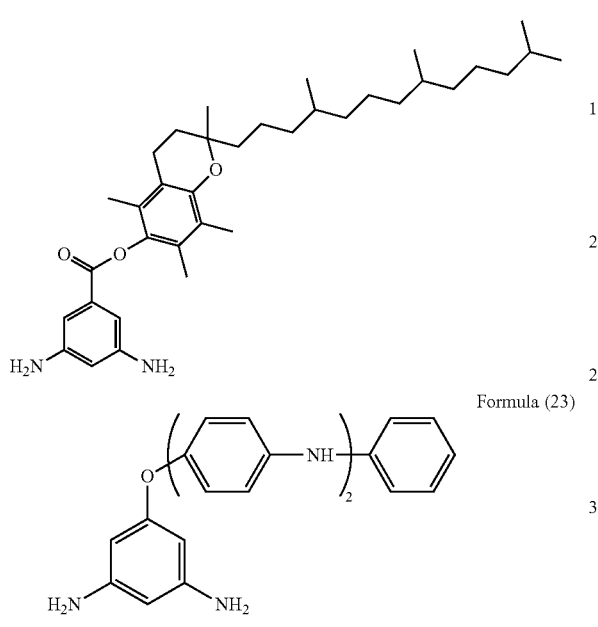
Formula (24)
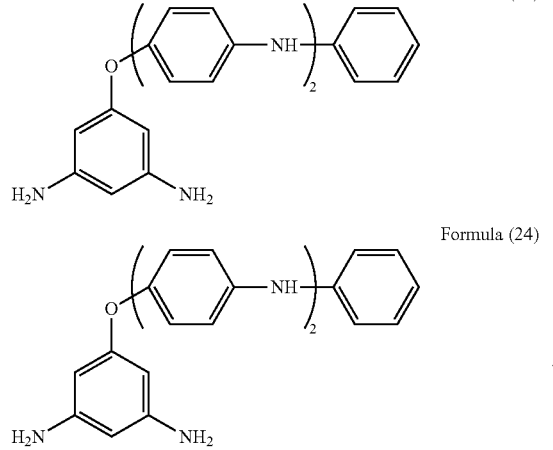
Formula (25)
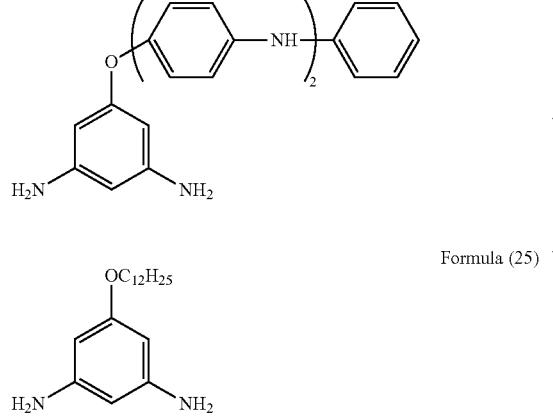
Formula (26)
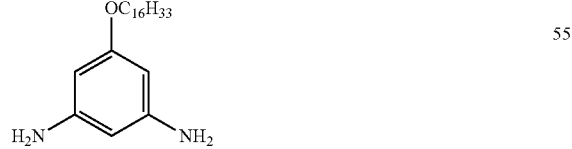
Formula (27)
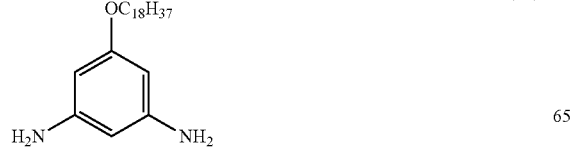
Formula (28)
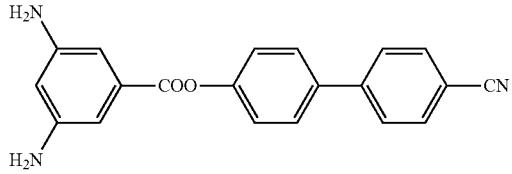
Formula (29)
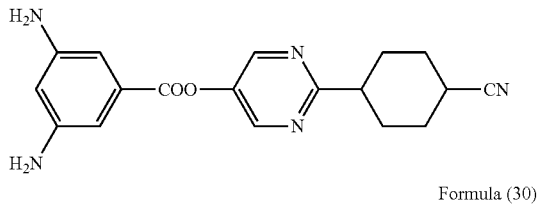
Formula (30)
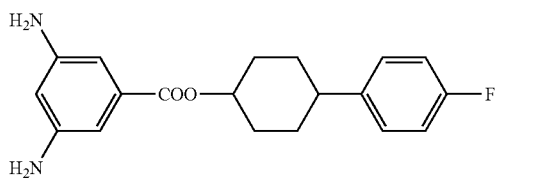
Formula (31)
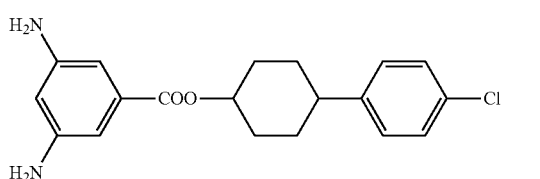
Formula (32)
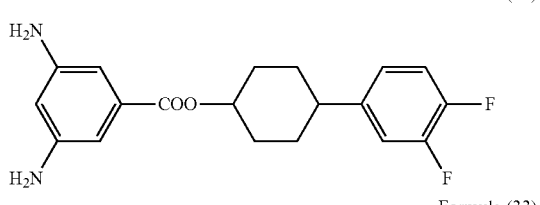
Formula (33)
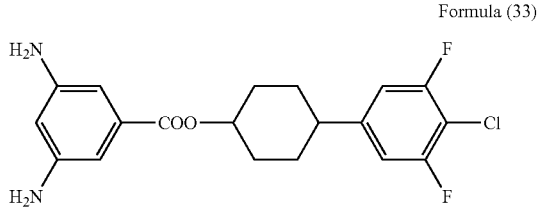
Formula (34)
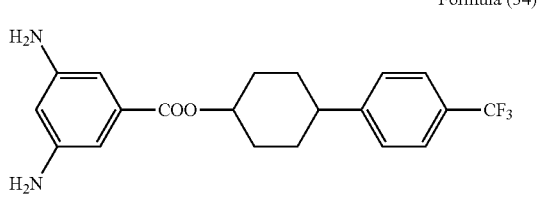
Formula (35)
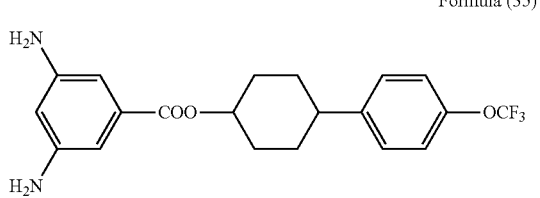

-continued

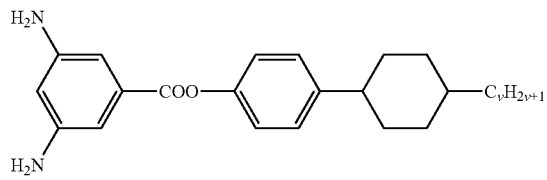

Formula (36)

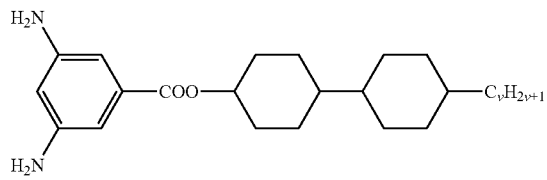

Formula (37)

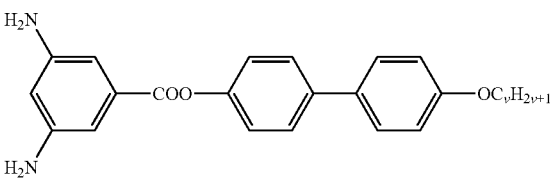

Formula (38)

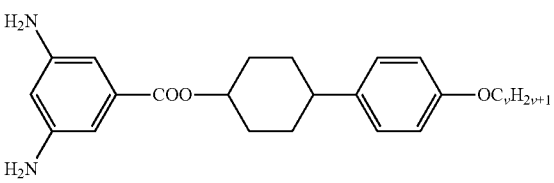

Formula (39)

(wherein, v is an integer from 3 to 2.)

Synthesis of Polyamic Acid Polymer (A-1)

In the present invention, the polyamic acid polymer (A-1) is obtained from a polycondensation reaction between a tetracarboxylic dianhydride compounds and a diamine compounds, in which the proportion of the tetracarboxylic dianhydride compounds and the diamine compounds corresponds to per 1 equivalent of amino groups of the diamine compounds, and the acid anhydride groups of the tetracarboxylic dianhydride compounds is generally 0.2 to 2 equivalents, preferably 0.3 to 1.2 equivalents.

In the polycondensation reaction of the polyamic acid polymer (A-1), reaction temperature of the tetracarboxylic dianhydride compound and the diamine compounds in an organic solvent is generally −20 to 150° C., preferably 0 to 100° C. As long as the organic solvent is able to dissolve the reactants and the products, there are no particular limitations on the type of organic solvent used. Examples of organic solvents include: aprotic polar solvents: N-methyl-2-pyrrolidone, N,N-dimethylacetamide, N,N-dimethylformamide, dimethylsulfoxide, γ-butyrolactone, tetramethyl urea, hexamethylphosphoryl triamine, and the like; and phenolic solvents: meta-cresol, xylenol, phenol, halogenated phenols, and the like.

In the aforementioned organic solvents can be used in combination with a poor solvent such as alcohols, ketones, esters, ethers, halogenated hydrocarbon compounds, hydrocarbon compounds, and the like in such an amount that does not cause precipitation of the formed polymer. Examples of poor solvents include: methyl alcohol, ethyl alcohol, isopropyl alcohol, cyclohexanol, glycol, propylene glycol, 1,4-butanediol, triethylene glycol, acetone, methyl ethyl ketone, methyl isobutyl ketone, cyclohexanol, methyl acetate, ethyl acetate, butyl acetate, diethyl oxalate, diethyl malonate, diethyl ether, ethylene glycol methyl ether, ethylene glycol ethyl ether, ethylene glycol n-propyl ether, ethylene glycol isopropyl ether, ethylene glycol n-butyl ether, ethylene glycol dimethyl ether, ethylene glycol ethyl ether acetate, diethylene glycol dimethyl ether, tetrahydrofuran, dichloromethane, 1,2-dichloroethane, 1,4-dichlorobutane, trichloroethane, chlorobenzene, o-dichlorobenzene, hexane, heptane, octane, benzene, toluene, xylene, and the like.

The aforementioned obtained the polyamic acid polymer (A-1) reaction solution is poured into a large amount of poor solvent to obtain a precipitate which is then dried under low pressure drying or low pressure distillation to obtain the polyamic acid polymer (A-1). In addition, the polyamic acid polymer (A-1) is further dissolved in an organic solvent, and precipitated with a poor solvent, or dried under low pressure distillation using an evaporator is carried out once or a plurality of times to purify the polyamic acid polymer (A-1).

Synthesis of Polyimide Polymer (A-2)

A polyimide polymer (A-2) of the present invention is obtained by further dehydration/ring-closure (imidization) processing of the polyamic acid polymer (A-1).

Examples of imidization processing methods of the polyamic acid polymer (A-1) such as dissolving the polyamic acid polymer (A-1) in an organic solvent, and heating in the presence of a dehydrating agent and imidization catalyst to implement a dehydration/ring closing reaction. Heating temperature of the imidization process is generally 40 to 200° C., preferably 80 to 150° C.

If the reaction temperature of the imidization process is lower than 40° C., the dehydration ring closing reaction cannot be fully implemented. If the reaction temperature exceeds 200° C., then molecular weight of the obtained polyimide polymer (A-2) is reduced.

On the other hand, in the aforementioned polyamic acid polymer (A-1) solution, the dehydrator used include an acid anhydride compound such as acetic anhydride, propionic anhydride, trifluoroacetic anhydride, and the like. Preferred dosage of the dehydrating agent is 0.01 to 20 moles per mole of the polyamic acid polymer (A-1), the imidization catalyst used include tertiary amines such as: pyridine, trimethylpyridine(collidine), dimethyl pyridine(lutidine), triethylamine, and the like. Preferred dosage of the imidization catalyst is 0.5 to 10 moles per mole of the dehydrating agent, and the solvent used in the imidization process are the same as the solvents mentioned in the aforementioned polycondensation reaction of the polyamic acid polymer (A-1), In addition, the same operation as in the method of purifying a polyamic acid polymer (A-1) is carried out on the polyimide polymer (A-2) reaction solution to purify polyimide polymer (A-2).

Synthesis of Polyimide Series Block Copolymer (A-3)

In the components of the liquid crystal alignment agent of the present invention, the polyimide series block copolymer (A-3) comprises polyamic acid block copolymer (A-3-1) and/or polyimide block copolymer (A-3-2) and/or polyamic acid-polyimide block copolymer (A-3-3). In the synthesis reaction of the polyimide series block copolymer (A-3), the polyimide series block copolymer (A-3) is obtained by further polycondensation reaction of compounds selected from the aforementioned polyamic acid polymer (A-1), polyimide polymer (A-2), tetracarboxylic dianhydride compounds, and diamine compounds in organic solvent. For example: two kinds of different structure of polyamic acids polymers (A-1) are structurally different from each other and terminal groups of each polyamic acid are different; two kinds of different structure of polyimide polymers (A-2) are structurally different from each other and terminal groups of each polyimide are different; a polyamic acid polymer (A-1) and a polyimide polymer (A-2) are structurally different and having different terminal groups; a polyamic acid polymer (A-1) and a tetracarboxylic dianhydride and a diamine, wherein at least one of the tetracarboxylic dianhydride and diamine used is structurally different from which used in the polycondensation reaction of the polyamic acid polymer (A-1); a polyimide polymer (A-2) and a tetracarboxylic dianhydride and a diamine, wherein at least one of the tetracarboxylic dianhydride and diamine used is structurally different from which used in the polycondensation reaction of the polyimide polymer (A-2); a polyamic acid polymer (A-1) and a polyimide polymer (A-2) and a tetracarboxylic dianhydride and a diamine, wherein at least one of the tetracarboxylic dianhydride and diamine used is structurally different from which used in the polycondensation reaction of the polyamic acid polymer (A-1) and the polyimide polymer (A-2); two kinds of different structure of polyamic acid polymers (A-1) are structurally different from each other and a tetracarboxylic dianhydride and a diamine; two kinds of different structure of polyimide polymers (A-2) are structurally different from each other and a tetracarboxylic dianhydride and a diamine; two kinds of different structure of polyamic acid polymers (A-1) having acid anhydride terminal groups are structurally different from each other and a diamine; two kinds of different structure of polyamic acid polymers (A-1) having amino terminal groups are structurally different from each other and a tetracarboxylic dianhydride; two kinds of different structure of polyimide polymers (A-2) having acid anhydride terminal groups are structurally different from each other and a diamine; two kinds of different structure of polyimide polymers (A-2) having amino terminal groups are structurally different from each other and a tetracarboxylic dianhydride; and the like.

In the polycondensation reaction of the polyimide series block copolymer (A-3), the reaction temperature is generally 0 to 200° C., preferably 0 to 100° C. Examples of the solvent used are the same as the solvents mentioned in the polycondensation reaction of the aforementioned polyamic acid polymer (A-1).

In addition, the same operation as in the method of purifying the polyamic acid polymer (A-1) is carried out on the polyimide series block copolymer (A-3) reaction solution thus obtained to purify the polyimide series block copolymer (A-3).

Terminal-Modified Polymer

The polyamic acid polymer and the imidized polymer used in the present invention may be terminal modified polymers whose molecular weights have been adjusted. By using these terminal modified polymers, the coating properties of the liquid crystal alignment agent can be improved without impairing the effect of the present invention. The terminal modified polymers may be synthesized by adding an acid monoanhydride, monoamine compound or monoisocyanate compound to the reaction system when the polyamic acid polymer is to be synthesized. Examples of the acid monoanhydride include maleic anhydride, phthalic anhydride, itaconic anhydride, n-decylsuccinic anhydride, n-dodecylsuccinic anhydride, n-tetradecylsuccinic anhydride and n-hexadecylsuccinic anhydride. Examples of the monoamine compound include aniline, cyclohexylamine, n-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine and n-eicosylamine. Examples of the monoisocyanate compound include phenyl isocyanate and naphthyl isocyanate.

Epoxy Compound (B)

Based on 100 parts by weight of the solid content of the liquid crystal alignment agent, the epoxy compound (B) of the present invention is generally 0.1~45 parts by weight, preferably 1~40 parts by weight, and more preferably 2~35 parts by weight. When the epoxy compound (B) is lower than 0.1 parts by weight, then the voltage holding ratio of the liquid crystal alignment film is reduced, and image sticking easily occur. When the epoxy compound (B) is higher than 45 parts by weight, then heat resistance of the liquid crystal alignment film is reduced.

The epoxy compound (B) of the present invention include epoxy compound (B-1) having multi-ring aliphatic structures, examples of the epoxy compound (B-1) include diepoxy group compounds having multi-ring aliphatic structures such as dicyclopentadiene diepoxide, tricyclopentadiene diepoxide, tetracyclopentadiene diepoxide, pentacyclopentadiene diepoxide. Among these epoxy compound (B-1), dicyclopentadiene diepoxide and tricyclopentadiene diepoxide are preferred, and more preferably dicyclopentadiene diepoxide.

Regarding the epoxy compound (B) of the present invention, apart from the aforementioned compound (B-1), other epoxy compound (B-2) which do not impair the targeted physical properties can be further added.

Examples of other epoxy compound (B-2) include: ethylene glycol diepoxypropyl ether, polyethylene glycol diepoxypropyl ether, propylene glycol diepoxypropyl ether, tripropylene glycol diepoxypropyl ether, polypropylene glycol diepoxypropyl ether, neopentyl glycol diepoxypropyl ether, 1,6-hexylene glycol diepoxypropyl ether, tripropylene glycol diepoxypropyl ether, 2,2-dibromo-neopentyl glycol diepoxypropyl ether, 1,3,5,6-tetragylcidyl-2,4-hexanediol, N,N,N',N'-tetragylcidyl-m-xylenediamine, 1,3-bis(N,N-diepoxy propyl aminomethyl)cyclohexane, N,N,N',N'-tetraglycidyl-4,4'-diaminodiphenylmethane, 3-(N-allyl-N-epoxypropyl)aminopropyltrimethoxysilane, 3-(N,N-diepoxypropyl)aminopropyltrimethoxysilane.

In addition, the liquid crystal alignment agent of the present invention may contain a functional silane-containing compound in limits that do not impair the targeted physical properties in order to improve adhesion to the surface of the substrate. Examples of such functional silane-containing compounds such as 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxypropyl triethylsilicane, N-trimethoxypropyl triethylsilane, 10-trimethoxysilane-1,4,7-triazadecane, 10-triethoxysilane-1,4,7-triazadecane, 9-trimethoxysilane-3,6-diazanonylacetate, 9-triethoxysilane-3,6-diazanonylacetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(ethylene oxide)-3-aminopropyltrimethoxysilane, N-bis(ethylene oxide)-3-aminopropyltriethoxysilane.

Organic Solvent (C)

Examples of organic solvents able to serve as the organic solvent (C) of the liquid crystal alignment agent of the present invention include 1-methyl-2-pyrrolidone, γ-butyrolactone, γ-butyrolactam, N,N-dimethylformamide, N,N-dimethylethanamide, 4-hydroxyl-4-methyl-2-pentanone, ethylene glycol monomethyl ether, butyl lactate, butyl acetate, methoxyl methyl propionate, ethoxyl ethyl propionate, ethylene glycol methyl ether, ethylene glycol ethyl ether, ethylene glycol propyl ether, ethylene glycol isopropyl ether, butylcellosolve, ethylene glycol dimethyl ether, ethylene glycol ethyl ether acetate, diglycol dimethyl ether, diglycol diethyl ether, diglycol monomethyl ether, diglycol monoethyl ether, diglycol monomethyl ether acetate, diglycol monoethyl ether acetate.

Liquid Crystal Alignment Agent

The liquid crystal alignment agent of the present invention is generally composed by dissolving the polymer (A), the epoxy compound (B), and other additives in the organic solvent (C).

Regarding temperature modulation of the liquid crystal alignment agent of the present invention, 0 to 200° C. is preferred, and more preferably 20 to 60° C.

Concentration of the solid content in the liquid crystal alignment agent of the present invention is adjusted according to viscosity and volatility properties, and is generally 1~15 weight %, preferably 2~15 weight %, more preferably 3~15 weight %. In particular, the liquid crystal alignment agent of the present invention is coated on a substrate surface, during formation of the film coating of the liquid crystal alignment film, when the concentration of the solid content of the liquid crystal alignment agent lies between 1~15 weight %, then the coating characteristics of the liquid crystal alignment agent are better.

The liquid crystal alignment agent of the present invention is coated on a glass substrate, and heated for 15 minutes at 220° C., thereby causing the liquid crystal alignment agent to form a hard coating film, and the hard coating film is extracted for 72 hours using acetone at 60° C. An epoxy value on the extract is designated O, and based on 100 parts by weight of the solid content of the liquid crystal alignment agent, the parts by weight of the epoxy compound (B) is designated W. Accordingly, the O and W conform to the following equation:

$$[O \div W \times 10^3] \leq 0.55$$

The preferred numerical value of the aforementioned equation $[O \div W \times 10^3]$ is $\leq 0.50$, and more preferably with a value of $\leq 0.45$. If the numerical value of the equation $[O \div W \times 10^3]$ is >0.55, then the voltage holding ratio of the formed liquid crystal alignment film is low, resulting in problems of image sticking easily occurring.

Formation of the Liquid Crystal Alignment Film

The liquid crystal alignment agent of the present invention is applied to one side of the substrate having a transparent conductive film by a roller coating method, spinner coating method, printing method, ink-jet method, and the like, in which the printing method is preferred. The coating surface is then heated to form a coating film.

Examples of the aforementioned substrate include: alkali-free glass, soda-lime glass, hard glass (Pyrex glass), quartz glass, and the like used in liquid crystal display devices; or a plastic transparent substrate of polyethylene terephthalate, polybutylene terephthalate, polyether sulphone, polycarbonate. The transparent conductive film formed on one side of the substrate can use a NESA® film (NESA® is the registered trademark of USA PPG Corporation) made from tin oxide ($SnO_2$), or an ITO (indium tin oxide) film made from indium oxide-tin oxide ($In_2O_3$—$SnO_2$), and the like.

Before the application of the liquid crystal alignment agent, in order to improve the adhesion of the coating film to the substrate and the transparent conductive film, a functional silane-containing compound or functional titanium-containing compound may be applied to the surface of the substrate.

The heating process to form the alignment film comprises pre-bake and post-bake treatment after coating with the liquid crystal alignment agent, in which the pre-bake causes the organic solvent to volatilize and form an alignment film coating surface. Temperature of the pre-bake is generally from 30 to 120° C., preferably 40 to 110° C., and more preferably 50 to 100° C.

In addition, after the alignment agent forms the film coating layer on the surface of the substrate, the post-bake is further carried out, and a dehydration/ring-closure (imidization) reaction is carried out to form the imidized alignment film coating layer. Temperature for the heat processing is generally 150 to 300° C., preferably 180 to 280° C., and more preferably between 200 and 250° C.

Preferred film thickness of the formed alignment film coating layer is 0.001~1 μm, and more preferably 0.005~0.5 μm.

Alignment processing is rubbed in a certain direction with a roller wound with nylon, rayon, or cotton fiber cloth according to needs. Thereby, the alignability of the liquid crystal molecules is provided to the coating film to become a liquid crystal alignment film. Moreover, methods that provide the alignability of the liquid crystal molecules with protrusions or patterns formed on at least one substrate are widely known as MVA (Multi-domain Vertical Alignment) or PVA (Patterned Vertical Alignment) methods.

Liquid Crystal Display Element

Two substrates each having the liquid crystal alignment film formed as the aforementioned manufacturing method of the liquid crystal alignment film are prepared and opposed to each other with a space (cell gap). The peripheral portions of the two substrates are joined together with a sealing agent, liquid crystals are filled into the cell gap defined by the surfaces of the substrates and the sealing agent, and an injection hole is sealed up to form a liquid crystal cell. Then, a polarizer is affixed to the exterior sides of the liquid crystal cell, that is, the opposite sides of the substrates forming the liquid crystal cell to obtain the liquid crystal display element.

The sealing agent can be used an epoxy resin containing a curing agent, and spacer material can be used glass beads, plastic beads, or photosensitive epoxy resin. Examples of liquid crystals include: nematic liquid crystals, such as Schiff base liquid crystals, azoxy liquid crystals, biphenyl liquid crystals, phenylcyclohexane liquid crystals, ester liquid crystals, terphenyl liquid crystals, biphenylcyclohexane liquid crystals, pyrimidine liquid crystals, dioxane liquid crystals, bicyclooctane liquid crystals, cubane liquid crystals, and the like. To the above liquid crystals may be added cholesteric liquid crystals, such as cholesteryl chloride, cholesteryl nonanoate, cholesteryl carbonate, a chiral agent marketed under the trade names of C-15 or CB-15 (products of Merck Company), and the like. In addition, the polarizer affixed to the exterior sides of the liquid crystal cell may be used, for example, a polarizer comprising cellulose acetate protective films sandwiching the polarizing film called "H film", which has absorbed iodine while a polyvinyl alcohol is stretched and aligned, or a polarizer composed of the H film itself.

To enable a further understanding of said objectives and the technological methods of the invention herein, a brief description of the drawings is provided below followed by a detailed description of the preferred embodiments. The present invention will be further illustrated by the following examples.

BRIEF DESCRIPTION OF THE ATTACHED TABLE

Table 1 depicts composition ratios and evaluation results of embodiments and comparative examples of the liquid crystal alignment agent of the present invention.

DETAILED DESCRIPTION OF THE PREFERRED EMBODIMENTS OF THE PRESENT INVENTION

The following provides a concrete description of the present invention through embodiments, however the present invention is not limited to these embodiments. In the following embodiments and comparative examples, an evaluation is carried out on liquid crystal alignment agents and liquid crystal display elements prepared according to the methods described hereinafter.

Example of Synthesis 1

A 500 ml four-necked conical flask equipped with a nitrogen inlet, a stirrer, a heater, a condenser and a thermometer, then purged with nitrogen, and the components were charged to the flask. The components comprising 2.82 g (0.005 moles) of the compound represented in Formula (22) (hereinafter abbreviated as VEDA), 4.87 g (0.045 moles) of p-phenylenediamine (hereinafter abbreviated as PDA), and 80 g of the organic solvent N-methyl-2-pyrrolidone (hereinafter abbreviated as NMP) were charged to the flask. The components were stirred at room temperature until dissolved, after which 10.91 g (0.05 moles) of pyromellitic dianhydride (hereinafter abbreviated as PMDA) and 20 g of NMP were added and a reaction was allowed to continue for 2 hours at room temperature. After the reaction was finished, the polyamic acid polymer solution was poured into 1500 ml of water to precipitate the polymer. The polymer obtained after filtering was repeatedly washed using methanol and filtered three times, and then placed into a vacuum oven, where drying was carried out at 60° C., after which the polyamic acid polymer (A-1-1) was obtained.

Example of Synthesis 2

A 500 ml four-necked conical flask equipped with a nitrogen inlet, a stirrer, a heater, a condenser and a thermometer, then purged with nitrogen, and the components were charged to the flask. The components comprising 2.82 g (0.005 moles) of VEDA, 8.92 g (0.045 moles) of 4,4'-diaminodiphenylmethane (hereafter referred to as DDM) and 80 g of the organic solvent NMP. The components were stirred at room temperature until dissolved, after which 9.81 g (0.05 moles) of cyclobutane tetracarboxylic dianhydride (hereafter refer to as CBTA) and 20 g of NMP and a reaction was allowed to continue for 2 hours at room temperature. After the reaction was finished, the polyamic acid polymer solution was poured into 1500 ml of water to precipitate the polymer. Then, the polymer obtained after filtering was repeatedly washed using methanol and filtered three times, and then placed into a vacuum oven, where drying was carried out at 60° C., after which the polyamic acid polymer (A-1-2) was obtained.

Example of Synthesis 3

A 500 ml four-necked conical flask equipped with a nitrogen inlet, a stirrer, a heater, a condenser and a thermometer, then purged with nitrogen, and the components were charged to the flask. The components comprising 5.65 g (0.01 moles) of VEDA, 4.33 g (0.04 moles) of PDA, and 68 g of the organic solvent NMP. The temperature was raised to 60° C. and the components were stirred until dissolved, after which 15.01 g (0.05 moles) of 3,4-dicarboxy-1,2,3,4-tetrahydronaphthalene-1-succinic acid dianhydride (hereafter referred to as TDA) and 30 g of NMP were added and a reaction was allowed to continue for 6 hours at room temperature, thereby obtaining a reaction solution of polyamic acid polymer. 97 g of NMP, 5.61 g of acetic anhydride and 19.75 g of pyridine were further added, the temperature was raised to 60° C. and the contents stirred continually for 2 hours to carry out imidization. After the reaction was finished, the reaction solution of polyimide polymer was poured into 1500 ml of water to precipitate the polymer; the polyimide polymer obtained after filtering was repeatedly washed using methyl alcohol and filtered three times and then placed into a vacuum baking oven, where drying was carried out at 60° C., thereby obtaining the polyimide polymer (A-2-1).

Example of Synthesis 4

A 500 ml four-necked conical flask equipped with a nitrogen inlet, a stirrer, a heater, a condenser and a thermometer, then purged with nitrogen, and the components were charged to the flask. The components comprising 5.65 g (0.01 moles) of VEDA, 8.01 g (0.04 moles) of 4,4'-diaminodiphenyl ether (hereafter referred to as ODA) and 68 g of the organic solvent NMP. The temperature was raised to 60° C. and the components were stirred until dissolved, after which 15.01 g (0.05 moles) of TDA and 30 g of NMP were added and a reaction was allowed to continue for 6 hours at room temperature, thereby obtaining a reaction solution of polyamic acid polymer. 97 g of NMP, 5.61 g of acetic anhydride and 19.75 g of pyridine were further added, the temperature is was raised to 60° C. and the contents stirred continually for 2 hours to carry out imidization. After the reaction has finished, the reaction solution of polyimide polymer was poured into 1500 ml of water to precipitate the polymer; the polyimide polymer obtained after filtering was repeatedly washed using methyl alcohol and filtered three times and then placed into a vacuum baking oven, where drying was carried out at 60° C., thereby obtaining the polyimide polymer (A-2-2).

Example of Synthesis 5

A 500 ml four-necked conical flask equipped with a nitrogen inlet, a stirrer, a heater, a condenser and a thermometer, then purged with nitrogen, and the components were charged to the flask. The components comprising 2.82 g (0.005 moles) of VEDA, 18.47 g (0.045 moles) of 2,2'-bis[4-(4-aminophenoxy)phenyl]propane (hereafter referred to as BAPP) and 100 g of the organic solvent NMP. The components were stirred at room temperature until dissolved, after which 15.95 g (0.0495 moles) of 4,4'-benzophenone tetracarboxylic dianhydride (hereafter referred to as BTDA) and 205.42 g of the NMP were added and a reaction was allowed to continue for 2 hours at room temperature. After the reaction was finished, the polyamic acid polymer solution was poured into 1500 ml of water to precipitate the polymer; the polymer obtained after filtering was repeatedly washed using methyl alcohol and filtered three times and then placed into a vacuum baking oven, where drying was carried out at 60° C., thereby obtaining the polyamic acid polymer.

A 500 ml four-necked conical flask equipped with a nitrogen inlet, a stirrer, a heater, a condenser and a thermometer, then purged with nitrogen, and the components were charged to the flask. The components comprising 3 g of the aforementioned obtained polyamic acid polymer, and 17 g of the organic solvent NMP. The components were stirred at room temperature until dissolved, after which 3 g of the polyamic acid polymer (A-1-1) obtained from the example of synthesis 1 and 17 g of the NMP were added, and a reaction was allowed to continue for 6 hours at 60° C. The polymer solution was then poured into 1500 ml of water to precipitate the polymer; the polymer obtained after filtering was repeatedly washed using methyl alcohol and filtered three times and then placed into a vacuum baking oven, where drying was carried out at 60° C., thereby obtaining a polyamic acid block copolymer (A-3-1).

Example of Synthesis 6

A 500 ml four-necked conical flask equipped with a nitrogen inlet, a stirrer, a heater, a condenser and a thermometer, then purged with nitrogen, and the components were charged to the flask. The components comprising 2.82 g (0.005 moles) of VEDA, 8.92 g (0.045 moles) of DDM and 100 g of the organic solvent NMP. The components were stirred at room temperature until dissolved, after which 15.95 g (0.0495 moles) of BTDA and 205.42 g of the NMP were added and a reaction was allowed to continue for 6 hours at room temperature, whereupon 94.02 g of NMP, 15.15 g of acetic anhydride and 11.73 g of pyridine were further added, the temperature was raised to 110° C. and the contents stirred continually for 2 hours to carry out imidization. After the reaction has finished, the polyimide polymer solution was poured into 1500 ml of water to separate out the polymer; the polymer obtained after filtering was repeatedly washed using methyl alcohol and filtered three times and then placed into a vacuum baking oven, where drying was carried out at 60° C., thereby obtaining the polyimide polymer.

A 500 ml four-necked conical flask equipped with a nitrogen inlet, a stirrer, a heater, a condenser and a thermometer, then purged with nitrogen, and the components were charged to the flask. The components comprising 3 g of the aforementioned obtained polyimide polymer, and 17 g of the organic solvent NMP. The components were stirred at room temperature until dissolved, after which 3 g of the polyamic acid polymer (A-1-1) obtained from the example of synthesis 1 and 17 g of the NMP were added, and a reaction was allowed to continue for 6 hours at 60° C. The polymer solution was then poured into 1500 ml of water to precipitate the polymer, and the polymer obtained after filtering was repeatedly washed using methyl alcohol and filtered three times and then placed into a vacuum baking oven, where drying was carried out at 60° C., thereby obtaining a polyamic acid-polyimide block copolymer (A-3-3).

Examples and Comparative Examples of a Liquid Crystal Alignment Agent Example 1

80 parts by weight of the polyamic acid polymer (A-1-1) obtained from the aforementioned example of synthesis 1 and 20 parts by weight of dicyclopentadiene diepoxide (B-1-1) were dissolved in a cosolvent of 1350 parts by weight of NMP/350 parts by weight of butyl cellosolve (hereafter referred to as BC) at room temperature. The alignment agent solution obtained was coated onto an ITO (indium-tin-oxide) glass substrate using a printing machine (manufactured by Japan Nissha Printing Co., Ltd., Model S15-036), after which pre-bake was carried out on a heating plate at a temperature of 100° C. for five minutes, and post-bake was carried out in a hot air circulation baking oven at a temperature of 220° C. for 30 minutes. The film thickness was measured to around 800±200 Å using a film thickness measuring device (manufactured by KLA-Tencor, Model Alpha-step 500).

An alignment (rubbing) process of a surface of the thin film was carried out by using a rubbing machine (Model RM02-11, manufactured by Iinuma Gauge Mfg. Co., Ltd.) provided with a roller wound with nylon cloth, a stage moving rate of 50 mm/sec, a hair push-in length of 0.3 mm.

Two glass substrates having the liquid crystal alignment film were manufactured by the aforementioned steps, thermocompression adhesive agent was applied to one glass substrate, and spacers of 4 μm were sprayed on the other glass substrate. The glass substrates were aligned and bonded together in a vertical direction, and then 10 kg of pressure was applied using a thermocompressor, and the thermocompression carried out at 150° C.

Liquid crystal was poured in using a liquid crystal pour machine (manufacture by Shimadzu Corporation, Model ALIS-100X-CH), and then ultraviolet light is used to harden a sealant to seal the liquid inject hole, thereby manufacturing a liquid crystal cell.

Evaluation Methodology
(1) Epoxy Value

After coating the liquid crystal alignment agent using the printing machine (Japan Nissha Printing Co., Ltd., Model S15-036) on a glass substrate, it was heated for 15 minutes at 220° C. to form a hard coat film. The hard coat film is scraped from the glass substrate, and 0.5 g of the scraped hard coat film is extracted for 72 hours using 10 g of acetone at 60° C., after which an epoxy value was carried on the extract using the following steps:

Step 1: Precisely weigh 0.5~0.6 g of the extract into a 100 ml covered conical flask, and record the precise weighing value S (unit: g);
Step 2: Add 20 ml acetic acid/benzene (volume ratio 1/1) solution until fully dissolved;
Step 3: Add 3 drops of 1% phenolphthalein indicator;
Step 4: Add 5 drops of crystal-violet indicator;
Step 5: Titrate using 0.1N hydrogen bromide/acetic acid solution; and
Step 6: When the solution color changes from purple to blue-green and the blue-green color remains unchanged for 30 seconds, then titration is ended; record the titration volume V (unit: ml).

Epoxy value of extract O (unit: g of equivalent weight of epoxy group/100 g) obtained according to the following calculation formula.

$$\text{Epoxy value of extract}(O)=[(V-B) \times F \times 0.16]/S$$

wherein,
S: specimen weight (g),
V: titration volume (ml),
B: titration volume required for blank test (ml), and
F: factor of hydrogen bromide/acetic acid titration solution.

Factor standardization of hydrogen bromide/acetic acid titration solution:
1. Precisely weigh 0.1 g of sodium carbonate ($Na_2CO_3$) (prepared in advance by drying at 600° C. for 1 hour) into a (covered 100 ml Erlenmeyer flask) capacity of 100 ml Erlenmeyer with a cover, record precise weighing value w (the unit: g).
2. Add 20 ml of acetic acid/benzene solution (volume ratio 1/1).
3. Add 10 drops of crystal-violet indicator.
4. Titrate using 0.1N hydrogen bromide/acetic acid solution.

5. When the color changes from purple to blue-green, then titration is ended; record titration volume A (unit: ml).
6. Factor=weight of sodium carbonate (w)/(0.0053×A)

(2) Voltage Holding Ratio

The voltage holding ratio of the liquid crystal cell was measured using an electrical measuring machine (manufactured by TOYO Corporation, Model 6254), with a 4 volts voltage was applied for 120 microseconds. The applied voltage was held for 16.67 milliseconds, after the applied voltage was cut off for 16.67 milliseconds, the voltage holding ratio was measured and evaluated according to the following standards:

○: Voltage holding ratio >96%.
Δ: Voltage holding ratio is between 94 to 96%.
X: Voltage holding ratio <94%

(3) Image Sticking

After applying 10 volts of direct voltage for 48 hours to the manufactured liquid crystal cell, visually observe whether image sticking occur on a display screen when the voltage application is canceled.

○: No occurrence of Image Sticking.
X: Occurrence of Image Sticking.

Example 2

The operating procedure of Example 1 was repeated, except that the dosage of the polymer (A) and the epoxy compound (B); details and evaluation results are shown in Table 1.

Example 3

The operating procedure of Example 1 was repeated, except that the kind and dosage of polymer (A), the dosage of epoxy compound (B); details and evaluation results are shown in Table 1.

Example 4

The operating procedure of Example 1 was repeated, except that the kind and dosage of polymer (A), the dosage of epoxy compound (B), the dosage of organic solvent (C), and omission of the subsequent alignment process procedure; details and evaluation results are shown in Table 1.

Example 5

The operating procedure of Example 1 was repeated, except that the kind and dosage of polymer (A), the dosage of epoxy compound (B), the dosage of organic solvent (C), and omission of the subsequent alignment process procedure; details and evaluation results are shown in Table 1.

Example 6

The operating procedure of Example 1 was repeated, except that the kind and dosage of polymer (A), the dosage of epoxy compound (B), the dosage of organic solvent (C); details and evaluation results are shown in Table 1.

Example 7

The operating procedure of Example 1 was repeated, except that the kind and dosage of polymer (A), the dosage of compound (B), the dosage of organic solvent (C); details and evaluation results are shown in Table 1.

Example 8

The operating procedure of Example 1 was repeated, except that the kind and dosage of polymer (A), the dosage of epoxy compound (B); details and evaluation results are shown in Table 1.

Comparative Example 1

The operating procedure of Example 1 was repeated, except that the kind of epoxy compound (B); details and evaluation results are shown in Table 1.

Comparative Example 2

The operating procedure of Example 4 was repeated, except that the kind of the epoxy compound (B); details and evaluation results are shown in Table 1.

Comparative Example 3

The operating procedure of Example 4 was repeated, except that the kind of the epoxy compound (B); details and evaluation results are shown in Table 1.

Comparative Example 4

The operating procedure of Example 7 was repeated, except that the kind of the epoxy compound (B); details and evaluation results are shown in Table 1.

Comparative Example 5

The operating procedure of Example 4 was repeated, except that the dosage of the polymer (A); and without the addition of the epoxy compound (B); details and evaluation results are shown in Table 1.

While the present invention is illustrated with the preferred embodiments aforementioned, scope of the invention is not thus limited and should be determined in accordance with the appended claims.

TABLE 1

|  |  | Examples ||||||||
| --- | --- | --- | --- | --- | --- | --- | --- | --- | --- |
| Components |  | 1 | 2 | 3 | 4 | 5 | 6 | 7 | 8 |
| Polymer (A) | A-1-1 | 80 | 70 |  |  |  |  |  | 75 |
| (parts by weight) | A-1-2 |  |  | 60 |  |  |  |  |  |
|  | A-2-1 |  |  |  | 90 |  |  |  | 15 |
|  | A-2-2 |  |  |  |  | 95 |  |  |  |
|  | A-3-1 |  |  |  |  |  | 90 |  |  |
|  | A-3-3 |  |  |  |  |  |  | 95 |  |

TABLE 1-continued

| | | | | | | | | | |
|---|---|---|---|---|---|---|---|---|---|
| Epoxy Compound (B) (parts by weight) | B-1-1 | 20 | 30 | 40 | 10 | 5 | | 5 | |
| | B-1-2 | | | | | | 10 | | 9 |
| | B-2-1 | | | | | | | | 1 |
| | B-2-2 | | | | | | | | |
| Organic Solvent (parts by weight) | C-1 | 1350 | 1350 | 1350 | 1500 | 1500 | 1100 | 1100 | 1350 |
| | C-2 | 350 | 350 | 350 | 200 | 200 | 600 | 600 | 350 |
| Extracted Epoxy Value O (unit: g of equivalent weight of epoxy group/100 g) | | 0.005 | 0.012 | 0.021 | 0.0012 | 0.0002 | 0.001 | 0.0001 | 0.0015 |
| Part by Weight of Epoxy Compound (B) W (unit: based on 100 parts by weight of the solid content of alignment agent) | | 20 | 30 | 40 | 10 | 5 | 10 | 5 | 10 |
| [O ÷ W × 10³] | | 0.25 | 0.40 | 0.45 | 0.12 | 0.04 | 0.10 | 0.02 | 0.15 |
| Evaluation Results | Voltage Holding Ratio | ○ | ○ | ○ | ○ | ○ | ○ | ○ | ○ |
| | Image Sticking | ○ | ○ | ○ | ○ | ○ | ○ | ○ | ○ |

| | | Comparative Examples | | | | |
|---|---|---|---|---|---|---|
| | Components | 1 | 2 | 3 | 4 | 5 |
| Polymer (A) (parts by weight) | A-1-1 | 80 | | | | 100 |
| | A-1-2 | | | | | |
| | A-2-1 | | 90 | | | |
| | A-2-2 | | | | | |
| | A-3-1 | | | 90 | | |
| | A-3-3 | | | | 95 | |
| Epoxy Compound (B) (parts by weight) | B-1-1 | | | | | |
| | B-1-2 | | | | | |
| | B-2-1 | 20 | 10 | | 5 | |
| | B-2-2 | | | 10 | | |
| Organic Solvent (parts by weight) | C-1 | 1350 | 1500 | 1100 | 1100 | 1350 |
| | C-2 | 350 | 200 | 600 | 600 | 350 |
| Extracted Epoxy Value O (unit: g of equivalent weight of epoxy group/100 g) | | 0.026 | 0.008 | 0.0065 | 0.003 | — |
| Part by Weight of Epoxy Compound (B) W (unit: based on 100 parts by weight of the solid content of alignment agent) | | 20 | 10 | 10 | 5 | — |
| [O ÷ W × 10³] | | 1.30 | 0.80 | 0.65 | 0.60 | — |
| Evaluation Results | Voltage Holding Ratio | X | Δ | X | X | X |
| | Image Sticking | X | X | X | X | X |

B-1-1: Dicyclopentadiene diepoxide
B-1-2: Tricyclopentadiene diepoxide
B-2-1: N,N,N',N'-tetraglycidyl-4,4'-diaminodiphenylmethane
B-2-2: N,N,N',N'-tetraglycidyl-m-xylenediamine
C-1: N-methyl-2-pyrrolidone
C-2: Butyl cellosolve

What is claimed is:

1. A liquid crystal alignment agent, comprising:
a polymer (A) obtained from a reaction between tetracarboxylic dianhydride compound and diamine compound;
an epoxy compound (B); and
an organic solvent (C);
wherein the epoxy compound (B) includes epoxy compound (B-1) having multi-ring aliphatic structures and the liquid crystal alignment agent is coated on a glass substrate, and heated for 15 minutes at 220° C. to form a hard coating film, the hard coating film is extracted for 72 hours by using acetone at 60° C. to obtain an extract, an epoxy value on the extract is designated O, and based on 100 parts by weight of the solid content of the liquid crystal alignment agent, the parts by weight of the epoxy compound (B) is designated W, the O and W conform to the following equation:

$[O \div W \times 10^3] \leq 0.55$ wherein the epoxy compound (B-1) is selected from the group consisting of dicyclopentadiene diepoxide, tricyclopentadiene diepoxide, tetracyclopentadiene diepoxide, and pentacyclopentadiene diepoxide.

2. The liquid crystal alignment agent as claimed in claim 1, wherein the equation is $[O \div W \times 10^3] \leq 0.50$.

3. The liquid crystal alignment agent as claimed in claim 1, wherein the equation is $[O \div W \times 10^3] \leq 0.45$.

4. The liquid crystal alignment agent as claimed in claim 1, wherein, based on 100 parts by weight of the solid content of the liquid crystal alignment agent, the epoxy compound (B) is 0.1~45 parts by weight.

5. A liquid crystal alignment film formed from a liquid crystal alignment agent as claimed in claim 1.

6. A liquid crystal display element comprising a liquid crystal alignment film as claimed in claim 5.

* * * * *